United States Patent Office 3,052,754
Patented Sept. 4, 1962

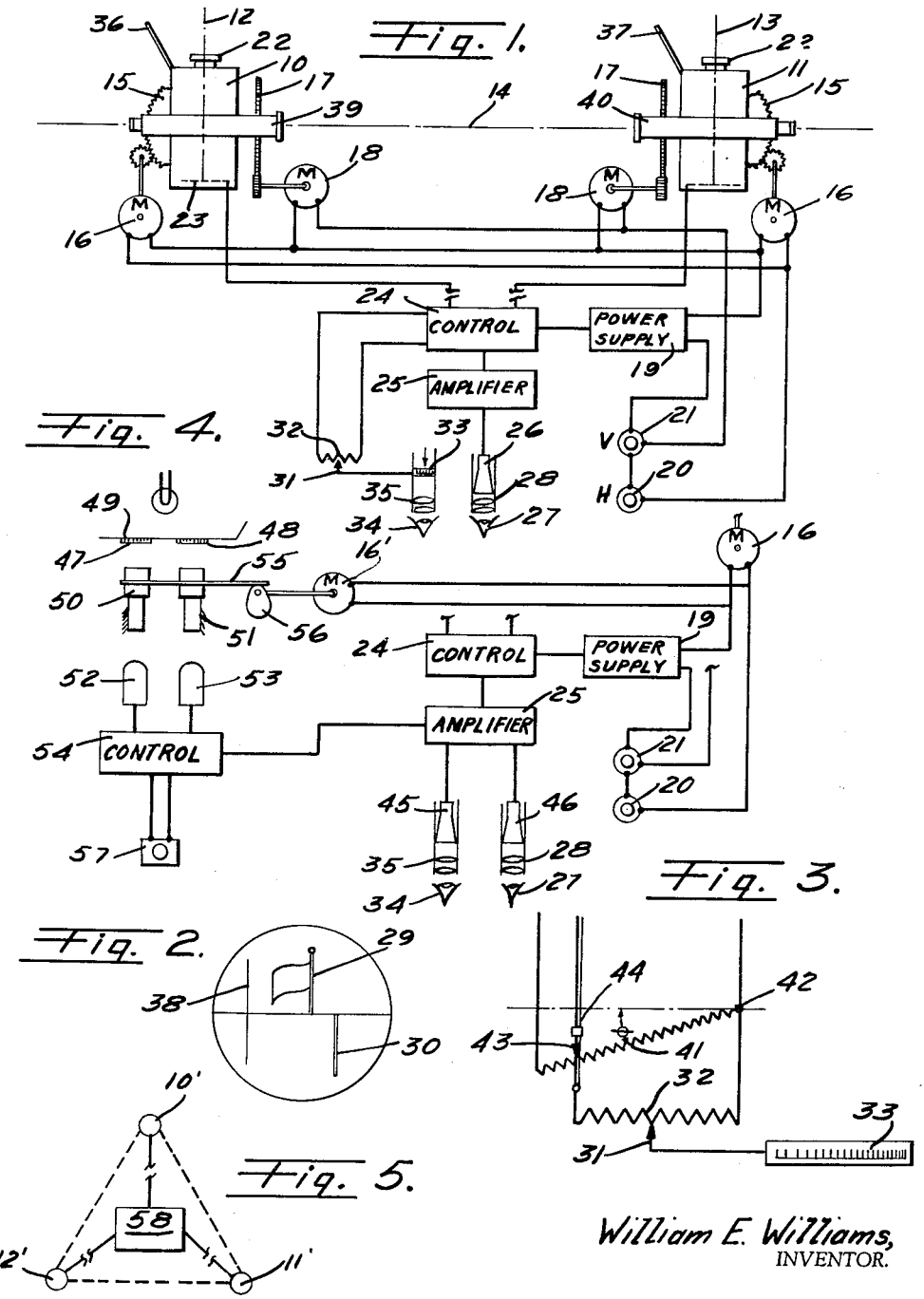

3,052,754
ELECTRO-OPTICAL RANGE FINDERS
William E. Williams, Pasadena, Calif., assignor to Cepac, Inc., a corporation of Delaware
Filed Mar. 23, 1959, Ser. No. 801,358
5 Claims. (Cl. 178—6.5)

The present invention relates generally to improvements in range finders, and is more particularly concerned with an electro-optical range finder for bridging the gap between the effective limitations of purely optical range finders, and the very large ranges that can be approximately measured by radio location methods.

The accuracy, and therefore the useful range of conventional optical range finders, whether of the coincidence or stereoscopic type, is limited primarily by the shortness of the base length that can be practically employed. The optical beam from each end of the conventional range finder has to traverse half the base length, so that a long base length is not practicable with reasonable sized objectives and pentagonal prisms. Otherwise, the angular aperture available becomes too small for practical use. In consequence, increased accuracy has had to be sought for in a more stringent assessment of very small parallax angles, which in turn calls for laborious elimination of temperature and vibrational effects coupled with optical components of the highest quality in accurate adjustment and alignment. The purely optical range finder is further frequently limited by conditions of haze and smoke that cause scattering of the green spectral region that gives maximum visual sensitivity.

Even when using micro wave lengths, the radio locator is, amongst other things, severely limited by the basic fact that the minimum angle of resolution is proportional to the effective diameter of the antenna, measured in wave lengths.

According to the present invention, the pentagonals and objectives of the optical range finder are replaced by a matched pair of high resolution television cameras. The roof prism and eyepiece assembly are replaced by one or a pair of miniature, high resolution cathode ray tube or tubes. The deflecting system of the coincidence type range finder, is replaced by a simple electrical device, connected to the scale and in stereoscopic counterpart, the two scales, one in each eyepiece, are replaced by similar scales independently generated and superposed on the images in the observing pair of cathode ray tubes, properly spaced at the normal interocular distance for optimum stereoscopic fusion.

While the two television cameras can be mounted on the ends of a single girder structure, and rotated or tilted as one unit, it is visualized that the more important practical application is for what could be termed a stationary base unit.

Having in mind the inherent limitations of the conventional coincident and stereoscopic range finders, the present invention envisions as one object the provision of an improved range finder which is not physically limited to a fixed base length.

A further object is to provide unique means for compensating for swinging movements of the spaced optical axes of the range finder from a position normal to the base line or locus line connecting the swing centers.

A still further object is to provide improved means for augmenting the stereoscopic observation in range finders by employing unique electro-optical means.

Another object of the herein described invention is to provide an improved stereoscopic range finder in which the range scale is superposed on the target image, and wherein novel means are provided for obtaining an optimum stereoscopic fusion of the images.

Yet another object is to provide an improved range finder of such character that a plurality of remote observation stations may be employed as compared to a single observing station such as now employed with conventional range finders.

A still further object resides in the use of an electro-optical range finder of such character that it may be employed for observing a target over an entire hemisphere without deviating more than thirty degrees from one or other of three available base lengths.

A still further object resides in the provision of an electro-optical range finder of such character that signals from objects outside the total relief sphere will cancel out so that the observations will not be confused by the multiplicity of stellar images.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view diagrammatically illustrating a coincidence type range finder embodying the principles of the present invention;

FIG. 2 is a view illustrating the observed images of the coincidence type range finder, the images being linearly displaced;

FIG. 3 is a view diagrammatically illustrating one arrangement for compensating for angular displacement of the optical axes from a position normal to the range finder base line;

FIG. 4 is a view schematically illustrating a stereoscopic range finder embodying the features of the present invention; and FIG. 5 is a modified arrangement of the present invention, utilizing three pickup television camera units.

Referring now more specifically to the drawings, for illustrative purposes, the invention will first be described as embodied in a coincidence type range finder as disclosed in FIG. 1 of the drawings. As herein disclosed, the range finder comprises a pair of high resolution television pickup cameras 10 and 11 which are mounted in spaced apart relation so that each may be rotated either about a horizontal or vertical axis passing through the second nodal point of the optical system of each camera.

For swinging the cameras in a horizontal direction, so as to vary the direction of the respective optical axes 12 and 13 with respect to a common locus or a base line 14, each camera is provided with a gear 15 having a driving connection with an actuating synchronous motor 16, in each case.

For swinging the pickup cameras in a vertical plane, each camera is provided with a gear 17 which is driven by a synchronous motor 18, in each case.

The synchronous motors are energized from a suitable regulated power supply source 19, and provision is made for simultaneously controlling the motors 16 from a single control 20, while the motors 18 are simultaneously controllable through control 21. This control permits selective swinging of the television cameras as a unit through a horizontal plane, or tilting movement of the cameras as a unit through a vertical plane.

The pickup cameras 10 and 11 are of conventional design in which the light rays from an object or target are carried through a lens as represented at 22 and focused upon an electronically responsive medium 23 which may comprise the photosensitive surface of the mosaic of an iconoscope pickup tube or an equivalent surface of other well-known types of pickup tubes which permit electronic scanning of the object image in a manner well known to the art.

Although not shown, the television cameras are provided with the conventional horizontal and vertical sweep circuits which permit scanning of the image on the medium 23, the requisite potentials for this purpose being supplied from conventional control 24 connected with the regulated power supply 19, in a manner well known to the art. This control connects with broad band high frequency amplifiers 25, or alternatively a single amplifier with multiplexing circuits. The outputs of the pickup cameras are fed, after amplification, to television receiving means which includes a small high resolution cathode ray image tube 26 arranged to be viewed by one eye 27 of an observer through a suitable ocular 28.

By way of illustration, let it now be assumed that a distance flagstaff is being observed by the pickup cameras 10 and 11. By means of a simple switching device contained in the control equipment, the upper half of the image from one of the pickup cameras is fed to the image tube 26, while the other half of the image from the other camera is applied to the same image tube. The observed images will have the relationship as indicated in FIG. 2. For example, the upper portion of the flagstaff as indicated by the numeral 29 will appear uppermost, while the lower half of the flagstaff as indicated by the numeral 30 will appear below. The upper and lower images will be linearly separated, as indicated, this separation being a proportional measurement of the angle that the flagstaff subtends at the base length or spacing between the optical axes of the television cameras 10 and 11.

Mathematically, it may be considered that if the base length is $b$, the angle $\omega$ subtended by the flagstaff at a distance $R$, may be expressed by the formula:

$$\omega = b/R$$

In practical usage, the angle $\omega$, in radians, is small. If the image is exactly on the optical axis 12 of camera 10, the image on the medium 23 of camera 11 will be displaced a distance $$\frac{bf}{R}$$

from the corresponding center, $f$ being the effective focal length of either camera objective. The equivalent linear displacement on the face of the image tube 26 will be reduced by a further factor C which is the ratio of the size of the horizontal field on the image tube 26 corresponding to an equivalent horizontal field on the mediums 23 of cameras 10 and 11. This may be termed the Electrical Magnification of the system.

Referring again to FIG. 2, the displaced flagstaff portions 29 and 30 may be placed in coincidence by adjusting the bias or average potential of the horizontal deflecting plates of the iconoscope unit contained in either of the television cameras 10 or 11. This bias adjustment may be readily accomplished by adjusting the movable contact 31 of a potentiometer 32 connected with the control for the cameras, in a manner well understood in the art. Since this adjustment of the potentiometer is directly concerned with the lateral displacement of the images 29 and 30, the adjustment necessary to bring these images into coincidence will be a measure of the range distance of the target or object. The range distance may therefore be indicated upon a range scale 33 arranged to be observed by the other eye of an observer as indicated by the numeral 34, this observation being made through a suitable ocular 35.

As an alternative to the above described arrangement, a cathode ray tube having two electron guns therein may be utilized in place of the single image tube 26, one of the electron guns and associated electrodes forming the upper half image from one of the cameras, while the other electron gun forms the lower half of the image from the other camera. In such arrangement it will suffice to control the average potential of one or other of the deflecting plates of the image tube to obtain the desired displacement to effect coincidence.

It will be readily appreciated by those skilled in the art that the accuracy of the range values obtained will depend upon the correct alignment, that is the parallelism, of the optical axes of the television cameras 10 and 11 at all times. The initial optical alignment of the cameras may be effected by various methods. When the base length is short, for example, in the order of five meters, this alignment may be accomplished with a König Adjuster (German Patent No. 165,510, 1904) and as explained at page 203 in the book (English translation) entitled, "The Theory of Modern Optical Instruments," by Dr. Alexander Gleichen, 1918. While this is being done, the proper centering of the astigmatizer lenses 36 and 37 should be checked. The range scale 33 is set at infinity, and the appearance of the image from the adjuster should be a single vertical line 38 (FIG. 2) whether the astigmatizer lenses are swung into the beams or not. At this stage, two auto-collimating telescopes 39 and 40, mounted respectively at right angles to the optical axes of cameras 10 and 11, are finally adjusted in line and clamped to their respective cameras. When the cameras are later positioned at much greater separation, for example, ten to fifty miles, the correct alignment of the cameras, before the synchronous motors 16 and 18 are meshed in, can be quickly effected by means of these telescopes.

It will be appreciated that, if the television cameras 10 and 11 are rotated by the synchronous motors through a horizontal angle $\theta$ to observe a particular target, the effective base line will be reduced from $b$ to $b \cos \theta$. Thus, while the infinity point on the scale remains unaltered, the angle a target subtends at a given range will be reduced in proportion to $\cos \theta$. Hence, in order that the actual scale 33 provide correct range readings independent of the orientation $\theta$, the bias voltage supplied to deflect the lowermost half of the image into coincidence must be increased automatically in the ratio $1/\cos \theta$.

One method for accomplishing the above is schematically illustrated in FIG. 3. The maximum biasing voltage, instead of being applied directly between the ends of potentiometer 32, as previously described and shown in FIG. 1, will be applied between the ends of a uniform resistance bar 41, one end of this bar being supported on a pivot 42 for swinging movement, and the bar having a slide contact 43, supported for linear movement along a path 44. The contact 43 connects with one end of the potentiometer 32, while the other end of this potentiometer connects with the pivot 42. The resistance bar 41 is adjusted so that it will be at right angles to the path 44 when the cameras are directed in a direction so that their optical axes 12 and 13 are normal to the locus or base line 14, and the potential across the bar 41 adjusted so that with a scale 33 at its infinity mark, image coincidence is obtained with the König Adjuster. If the bar is now coupled either mechanically or electrically so that it moves with the horizontal angular displacement of the cameras, the rotation thereof about its pivot will correspond with the angle of displacement of the cameras. The potential across the potentiometer 32 will thus be varied according to secant $\theta$, and provided the infinity point of the scale 33 is correctly set, the scale reading will be independent of the variation of the effective base length due to swinging movement of the cameras.

The stereoscopic embodiment of the electro-optical range finder of the present invention will now be described, reference being had to FIG. 4. In this arrangement, the camera outputs are appropriately amplified in the manner previously described for the coincidence type range finder, but instead of being fed to a single image tube, are in this case fed to separate image tubes 45 and 46. These are viewed through oculars 35 and 28 by the two eyes 34 and 27 of the observer. The separation of the optical axes of 35, 45 from the optical axes of 28, 46 is equal to the interocular separation of the observer, who is presumed to have normal eyesight, the observer sees a much foreshortened stereoscopic image of the field.

Since the observer is looking at a virtual aerial image, instead of a real image on a screen, apart from the gain due to the purely stereoscopic effect, the observer will experience much the same gain in definition that is found in viewing a lantern slide transparency through a viewer consisting only of an ocular at the appropriate distance as compared to observing the real image of the same lantern slide projected on a screen and subtending the same angular diameter of the observer's eye.

It may be observed in accordance with the basic principles of stereoscopy that, if $\alpha$ is the minimum angle that the unaided eye can perceive or appreciate, the distance $R_0$, defined by the relationship $R_0 = b_0/\alpha$, where $b_0$ is the interocular distance, may be termed the radius of stereoscopic vision. All points or objects further from the eyes than $R_0$ therefore cannot be differentiated from objects at infinity. When a stereoscopic range finder is used, this radius, now termed Total Relief S is increased to:

$$S = R_0 \frac{b}{b_0} c$$

where $b$ is the base length and $c$ the magnification of the system. Substituting for $R_0$, we obtain:

$$S = \frac{bc}{\alpha}$$

Thus, total relief S is independent of $b_0$ the interocular distance, but depends on the effective base length of the instrument. According to the present invention, the cameras 10 and 11 can be synchronously rotated by the motors 16 through a horizontal angle $\theta$ so that the effective base length for a target that is not normal to the base becomes $b \cos \theta$.

If it now be considered that $x$ is the distance between two corresponding marks on two scales that stereoscopically correspond to a range value R, then $(b_0 - x)$, where $b_0$ is the interocular distance or the separation between the infinity marks of the two scales, has to be reduced to $(b_0 - x) \cos \theta$ in order that the scale will correspond to the reduced stereoscopic effect obtained with the shorter effective base length.

According to the present invention, two stereoscopic scales 47 and 48, computed for a base length $b$, are mounted in front of an illuminating screen 49. These scales are independently imaged by a matched pair of variable focus lenses 50 and 51, such as known by the trademark "Zoom," on to a pair of optical pickup tubes 52 and 53 connected with suitable controls 54 which transmit the scale images to the main amplifier 25 connected with the control 24 from the television tubes 10 and 11 in such manner that the images from the television cameras and the scale images will be superposed in the image tubes 45 and 46. The combination of the images from the television cameras and the scale images unite to form a stereoscopic image in binocular vision whereby the range of an object may be determined by reference to the scale markings and read off directly. An optical range finder of this type is described in the above-identified text by Dr. Gleichen on pages 197–199.

It is important that the infinity points on the scales 47 and 48 have the same linear separation as the optical axes of the lenses 50 and 51, and the electrical centers of the pickup tubes 52 and 53. The two lenses 50 and 51 are coupled together as diagrammatically shown by the bar 55 so as to have unitary focusing adjustment. Focusing adjustment is in this case effected by means of a cam 56 which is rotated synchronously with the horizontal swinging movement of either one of the television cameras. This may be accomplished by a mechanical interconnection with the cameras, or through an electric coupling in which a synchronous motor 16' is arranged to be actuated in unison with the motor 16—16 for driving the cameras. The shape of this cam is such that with the particular type of variable focus lenses chosen, the size of the images of the scales 47 and 48 on the pickup units 52 and 53 will vary according to cosine $\theta$. Thus, the superimposed scale patterns or images viewed in the image tubes 45 and 46 will change in exactly the same way as the stereoscopic relief changes with effective base length, only the infinity points on each scale remaining unaltered.

For optimum stereoscopic fusion, the scale images should be of substantially equal intensity and approximately of the same brightness as the target images observed in the image tubes 45 and 46. A suitable rheostat control 57 is utilized to accomplish this balance of light intensities, in a manner well understood in the art.

A possible disadvantage of the electro-optical range finder, when used with a fixed base line, is that the effective base length only remains reasonably large for a relatively small angular sweep of the pickup cameras in either the forward or reverse direction. This limitation can be obviated by the addition of a third camera unit to form an equilateral triangle as illustrated in FIG. 5 in which the cameras are indicated by the numerals 10', 11' and 12', of similar arrangement to the cameras previously described. These cameras are each driven by synchronous motors for unitary movements respectively through horizontal and vertical adjustment, and may be controlled from a central installation 58.

For relatively short base lengths, the position and azimuthal direction of unit 12' may be fixed by placing 60° deviation pentagonal prisms or mirrors in front of the auto collimator telescope when these are in alignment. With long base lengths, the positions of the three units may be determined by standard survey methods and the cameras aligned on appropriate stars before they are meshed in with the common synchronous motor drive.

It will be evident that by a simple switching device, which can be automatic if desired, the central control 58 can range any target over a whole hemisphere without deviating the cameras more than 30° from one or other of the three available base lengths. This means that the maximum reduction of effective base length will not exceed 86.6% for the most unfavorable situation.

It is sometimes the case that a target is moving so fast that any visual range finding is not practical. The alternative then, is to obtain an almost instantaneous measure of the time lag between the synchronous sweeps of the electron beams of the pickups into two cameras. Referring to FIG. 4, let it be assumed that saw tooth sweeps from left to right are utilized, and a target is normal to the base but within the distance of total relief for the instrument. The signal from camera 10 will arrive ahead of that from camera 11, and if these are fed to a linear time base oscilloscope, the distance between the pulses, will be a measure of the parallax angle or the target distance. A very real complication here can be the presence of a stellar background causing confusion in interpretation. This may be overcome by making use of the fact that the infinity points (or plane) for a stereoscopic pair are coincident, irrespective of base length. Hence, if the polarity of the output of one camera is reversed as compared to the other, the stellar patterns will be substantially cancelled, leaving only resultant pulses from the target within the total relief radius. Many methods of measuring short time lags between pulses have been developed in recent years, and several of these methods may be used as alternatives. It may some times be necessary to have accurate data on the right ascension and declination of the extra terrestrial object at the instant the range was measured. If the camera circle readings are not of sufficient accuracy, a high aperture ratio photographic camera, which could be conveniently driven by the same synchronous control, could be triggered at the time the time lag was determined. The developed photograph would then show the position of the object relative to the fixed stars so that, if the sidereal time were known, the position of the object in space would be fully determined.

While for most purposes, coaxial cable would serve to interconnect the various cameras to the central control, in some instances for reasons of economy it might be preferable to use micro wave links.

The basic advantage of the electro-optical range finder is that the variables have been separated, while in the purely optical equivalents they remain tied together. Thus, although the television cameras and image tubes available give a measure of the parallax angle not far removed in accuracy from that given by the telescopic component of a range finder, the discrepancy is more than compensated for by the relatively unlimited base length that can be used without any loss of angular field.

By making the pickup devices with sensitive surfaces of caesium-oxygen-silver, the maximum spectral response is in the deep red so that the scattering effect of haze and smoke are considerably diminished. Another factor that may at times be important is that while in the optical range finder, the scene is viewed by a single observer only, in the electro-optical equivalent, any number of observation units may be connected to the control installation typified by the amplifier 25 of FIG. 4. Even when the separation is small and two units such as the television cameras 10 and 11 are mounted parallel on ends of a light structure that can be rotated as a whole, the improvement in definition, when the stereoscopic images are viewed subjectively in a pair of small cathode ray tubes, is far more than could be accounted for by the stereoscopic effect alone.

Various modifications may suggest themselves to those skilled in the art without departing from the spirit of my invention, and, hence, I do not wish to be restricted to the specific form shown or uses mentioned, except to the extent indicated in the appended claims.

I claim:

1. An electro-optical range finder, comprising: a pair of spaced television pickup cameras; a pair of illuminated stereoscopic scales computed for a preselected range; means including a pair of pickup cameras for said scales; television receiver means including a pair of image tubes, each of said image tubes are connected to be responsive to one of said pickup cameras detecting the images and the scales corresponding to the same eye of an observer for displaying object images from said cameras and scale images from said pickup tubes in superposed relation, said displayed images in said image tubes having spaced optical axes corresponding to the interocular separation of an observer so as to form a virtual stereoscopic image of said object and scale to allow the range of the object to be read off of the scale.

2. An electro-optical range finder, comprising: a pair of spaced television pickup cameras; means for synchronously swinging said cameras through horizontal angles about points interconnected by a locus line therebetween to vary the direction of their optical axes; a pair of illuminated stereoscopic range scales spaced apart a distance corresponding to the interocular distance of an observer; a pair of pickup tubes; a pair of variable focus lens units for respectively focusing images of said scales on said pickup tubes; said pickup tubes and said lens units being optically aligned with said scales; television receiver means including image tubes for displaying object images from said cameras and scale images from said pickup tubes in superposed relation, said displayed images in said image tubes having spaced optical axes corresponding to the interocular separation of an observer so as to form a virtual stereoscopic image of said object and scale; and means for varying the focus of said lens units in accordance with the angular displacement of the optical axes of the cameras from a position normal to said locus line.

3. A stereoscopic range finder comprising a pair of television cameras spaced apart a preselected base length and arranged in parallel alignment whereby each camera views a scene from a slightly different angle from the other, a pair of stereoscopic range scales computed for the preselected base length and spaced apart a distance corresponding to the interocular distance of an observer, means for separately viewing each of said scales and providing electrical image signals representative thereof, a television receiver including means for separately and simultaneously displaying a pair of images having their optical axes spaced apart a distance corresponding to the interocular separation of an observer, and means for connecting the electrical images from said cameras and said scale images to said television receiver whereby the combined images intended for each eye of an observer are displayed on the television receiver in superimposed relation to allow a stereoscopic image to be formed whereby the range of an object may be directly read off by reference to the scale markings on the stereoscopic image.

4. A stereoscopic range finder as defined in claim 3 including means for synchronously swinging said cameras about said base to thereby vary the effective base length and means responsive to the swinging movement of said camera for modifying the scale images to correspond with the changes in base length.

5. A stereoscopic range finder as defined in claim 4 including a third television camera arranged in spaced apart relationship with said pair of cameras to form an equilateral triangle, means for synchronously swinging the cameras to simultaneously vary the direction of their optical axes, a remote television receiving station including means for selectively displaying objects images from two of said cameras, means for selectively connecting any desired two of said cameras to said image displaying means.

References Cited in the file of this patent
UNITED STATES PATENTS

| | | |
|---|---|---|
| 2,417,446 | Reynolds | Mar. 18, 1947 |
| 2,514,828 | Ayres | July 11, 1950 |
| 2,786,096 | Palmer | Mar. 19, 1957 |